United States Patent [19]

Yamada et al.

[11] Patent Number: 5,160,124
[45] Date of Patent: Nov. 3, 1992

[54] CLAMPING APPARATUS FOR WORK

[75] Inventors: Sohei Yamada; Hideaki Yokota, both of Kobe, Japan

[73] Assignee: Kabushiki Kaisha Kosmek, Hyogo, Japan

[21] Appl. No.: 805,658

[22] Filed: Dec. 12, 1991

[30] Foreign Application Priority Data

Dec. 28, 1990 [JP] Japan .................. 2-406309[U]

[51] Int. Cl.⁵ ............................. B23Q 3/06
[52] U.S. Cl. .................... 269/25; 269/60; 269/91; 269/152
[58] Field of Search ................. 269/91-94, 269/20, 25, 60, 56, 152

[56] References Cited

U.S. PATENT DOCUMENTS 2,325,387 7/1943 Fredrickson ............... 269/94
4,102,374 7/1978 Klein ...................... 269/25

OTHER PUBLICATIONS

Japanese published unexamined application No. 63-44733 Date: Mar. 25, 1988.

Primary Examiner—Robert C. Watson
Attorney, Agent, or Firm—Bacon & Thomas

[57] ABSTRACT

A pillar (3) is projected upwardly from a central portion (2) of a base plate (1), and at least two work receiving portions (4) (4) are disposed in the opposite sides of the peripheral portion of the base plate (1). A plurality of pressing arms (5) (5) are projected radially from the pillar (3) toward the work receiving portions (4) (4), and these pressing arms (5) (5) are supported horizontally pivotally by the pillar (3). A pressing hydraulic cylinder (6) is disposed in the projecting portion of the pressing arm (5) so as to face downwardly.

6 Claims, 9 Drawing Sheets

CLAMPING APPARATUS FOR WORK

BACKGROUND OF THE INVENTION

1. Field of the Invention

The present invention relates to a clamping apparatus for a work, which is adapted to be used for a horizontal machine tool such as a horizontal machining center and the like, and more specifically to a clamping apparatus adapted to clamp a plurality of works at a time.

2. Description of Prior Art

There is such a clamping apparatus comprising as follows as disclosed in Japanese Utility Model Laid Open Publication No. 63-44733.

It comprises a square pillar projected upwardly from a base plate at its center and a pair of work receiving portions disposed in the left and right opposite sides of the base plate. Height adjusting cylinders are disposed in the left and right opposite side portions of the pillar, and a pair of left and right pressing arms are projected from the upper portions of the cylinders. Clamping cylinders provided in the respective pressing arms are so disposed as to face the respective work receiving portions from above.

There are, however, following problems associated with the above-mentioned conventional construction.

When heavy work is carried and then placed on the base plate by means of a crane, it is impossible to directly lower the work onto the work receiving portion because the pressing arms are disposed in the upper spaces above the work receiving portions. Therefore, it takes more trouble to carry out the work placement operation. Further, since the pressing arms can be only raised and lowered vertically by means of the height adjusting cylinders, it is impossible to fine adjust the clamping position horizontally.

SUMMARY OF THE INVENTION

It is a first object of the invention to enable a work placement operation to be carried out easily.

It is a second object of the invention to enable a horizontal clamping position of a pressing means to be fine adjusted.

For accomplishing the above-mentioned objects, the present invention resides in a clamping apparatus constructed as follows.

In the clamping apparatus, a pillar is projected upwardly from a base plate at its central portion, and at least two work receiving portions are peripherally spaced apart in a peripheral portion of the base plate. At least two pressing arms are projected radially from the pillar toward the work receiving portions and these pressing arms are supported by the pillar so as to be horizontally pivotable thereabout. A pressing means composed of a hydraulic cylinder and the like is supported by the pressing arm so as to face the work receiving portion from above.

The present invention provides the following advantages.

When the work is placed onto the work receiving portion by means of a carrying machine such as a crane and the like, the pressing arms have been previously pivoted to an evacuative position outside the upper spaces above the work receiving portions. Thereby, since the work can be lowered directly onto the work receiving portion, the work placement operation becomes easier. Then, the pressing arms are pivoted to a clamping preparation position within the upper spaces above the working receiving portions, and subsequently the works can be clamped on the work receiving portions by means of the pressing means.

Since the horizontal clamping position of the pressing means can be fine adjusted with respect to the works by fine adjusting a pivot angle of the pressing arms at the time of clamping operation, also the adjusting operation becomes easier.

Incidentally, when a plurality of pressing arms are supported by the pillar composed of an externally threaded rod through a thread engagement so as to be pivotable and movable vertically, the clamping apparatus can be made small and simple in construction because the above-mentioned height adjusting cylinder having the conventional construction can be omitted. Further, since a clamping height can be adjusted by only threadably moving the plurality of pressing arms with respect to the pillar, also the clamping height adjusting operation becomes easier.

BRIEF DESCRIPTION OF THE DRAWINGS

The above and other objects, advantages and features of the invention will become apparent when considered with the following specification and accompanying drawings wherein:

FIG. 1 is an elevational view of a clamping apparatus thereof;

FIG. 2 is a plan view of the clamping apparatus thereof;

FIG. 3 is a vertical sectional view of a pressing means thereof;

FIG. 4 is an enlarged partial plan view of a clamping apparatus thereof, but otherwise corresponds to FIG. 2;

FIG. 5 is a sectional view taken along section line V—V in FIG. 4;

FIG. 6 is a perspective view showing a condition in which a jig plate is mounted to a working receiving portion;

FIG. 7 is a perspective view showing a work machining example in a first step;

FIG. 8 shows a work machining example in a second step;

FIG. 9 shows another machining example, but otherwise corresponds to FIG. 7;

FIG. 10 shows still another work machining example, but otherwise corresponds to FIG. 7;

DESCRIPTION OF THE PREFERRED EMBODIMENTS

Figure 1:
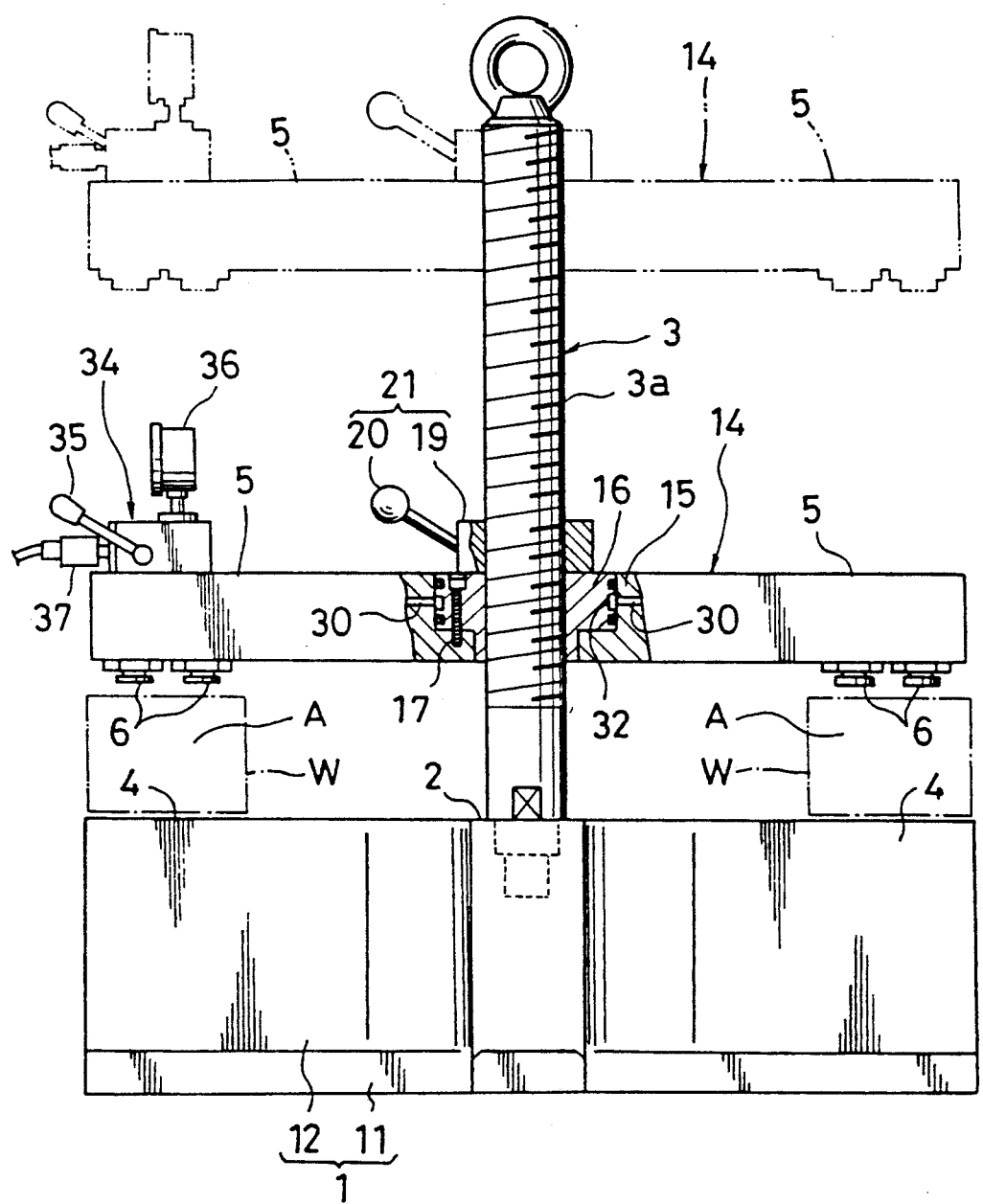
FIGS. 1 through 3 show a first embodiment of the present invention.
Figure 2:
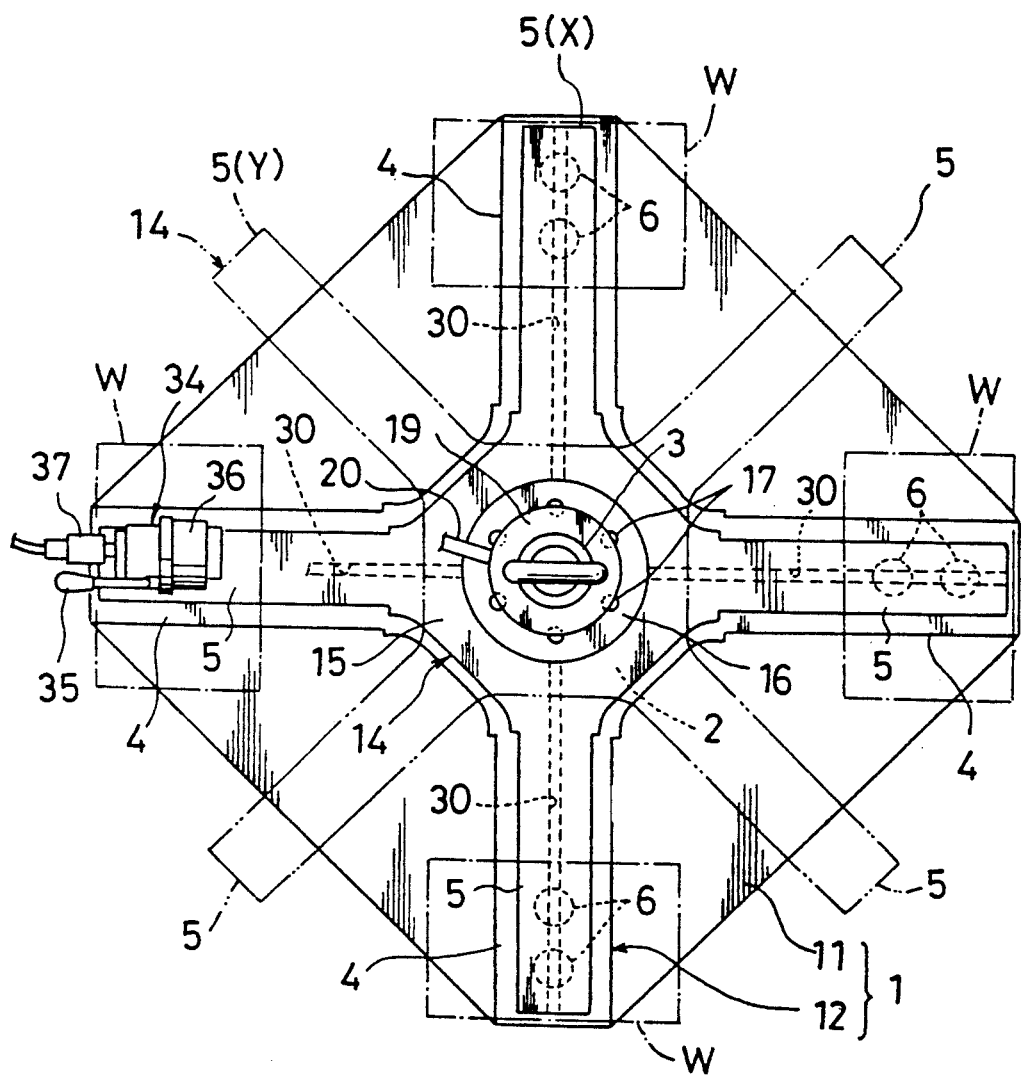
Figure 3:
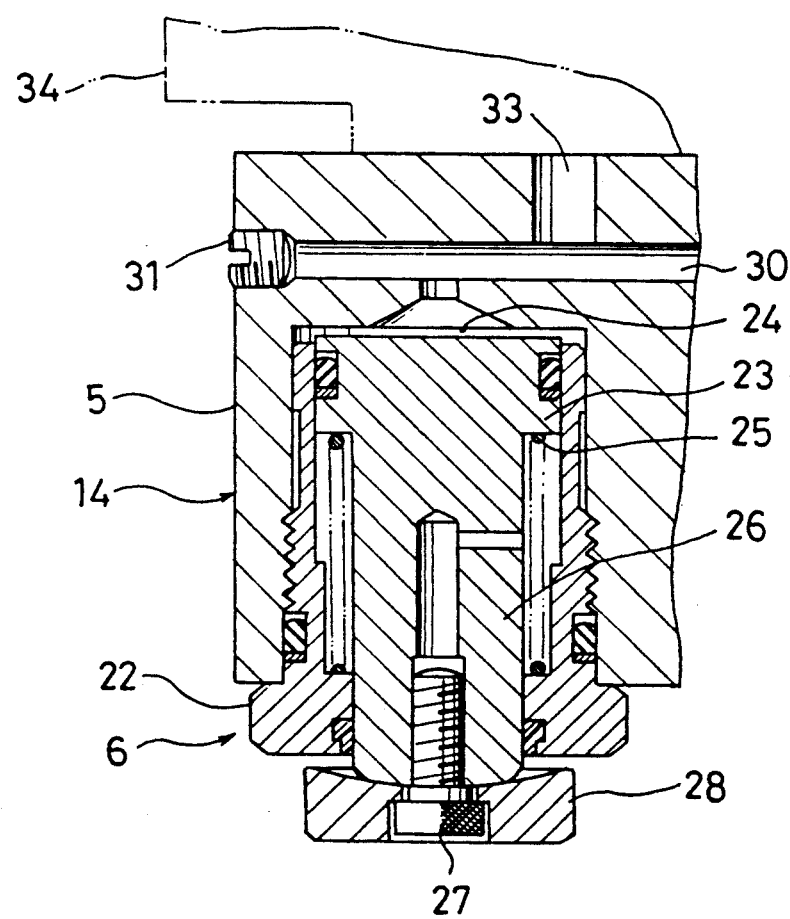

FIGS. 1 through 3 show a first embodiment of the present invention.

As shown in an elevational view of FIG. 1 and a plan view of FIG. 2, a base plate 1 of a clamping apparatus comprises a bottom plate 11 having a square configuration in a plan view and a lower block 12 having a cross configuration in a plan view. A pillar 3 composed of an externally threaded rod is threadably secured at its lower end portion to a central portion 2 of the lower block 12 and four work receiving portions 4 are arranged in the peripheral portion of the lower block 12 at intervals of 90 degrees. An upper block 14 having a cross configuration in a plan view is threadably engaged with the pillar 3 so as to be pivotable and movable vertically. The upper block 14 has four pressing arms 5 protruded radially from the peripheral surface of its square portion to the central portion of its square portion 15 by means of a plurality of bolts 17. The nut 16 and a locknut 19 are threadably engaged with an externally threaded portion 3a of the pillar 3. Those screw threads are formed by a trapezoidal thread having an included angle of 30 degrees. A pivot locking device 21 comprises the locknut 19 and an operation lever 20.

Two hydraulic cylinders 6, 6 as a pressing means are fixedly secured to the leading end portion of each pressing arm 5 in the downwardly facing manner and these hydraulic cylinders 6, 6 are opposed to each work receiving portion 4 from above so as to provide a work accommodation space A therebetween 4, 6. Incidentally, a work W is positioned on the upper surface of each work receiving portion 4 by means of a plurality of positioning pins (not illustrated).

As shown in FIG. 3, the hydraulic cylinder 6 is provided with a cover bolt 22 threadably secured to the pressing arm 5, a piston 23 inserted into the cover bolt 22, a hydraulic actuation chamber 24 formed above the piston 23 and an unclamping spring 25 mounted below the piston 23. A pressing member 28 is supported at a lower end of a piston rod 26 protruded downwardly from the piston 23 by means of a bolt 27.

As shown FIGS. 1 through 3, radial oil passages 30 are formed as through-holes in the respective pressing arms 5. The outer end portion of each oil passage 30 is closed by a plug 31, and the respective oil passages 30 are communicated at their inner end portions with one another through an annular oil passage 32 which is formed in the nut 16.

A changeover valve 34 is communicated with one of four radial oil passages 30 through a pressurized oil supply/discharge oil passage 33. The changeover valve 34 is adapted to be changed over between a pressurized oil supply position and a pressurized oil discharge position by manipulating an operation lever 35. The symbol 36 designates a pressure gauge, and the symbol 37 does a quick acting coupling for supplying/discharging the pressurized oil.

The above-mentioned clamping apparatus, the clamping operation is carried out in accordance with the following procedures.

When the work W is placed onto the base plate 1 by means of the crane, previously four pressing arms 5 of the upper block 14 is to be pivoted to an evacuative position Y (refer to the pressing arms 5 depicted by the alternate long and two short dashes line in FIG. 2). Under this condition, the work W is hung up and brought to the upper space above the work receiving portion 4 from a storage place by means of the crane and then lowered directly onto the work receiving portion 4 so as to be placed thereon. Also onto other work receiving portions 5, similarly the works W are placed. Subsequently, four pressing arms 5 are pivoted to a clamping preparation position X (refer to the pressing arms 5 depicted by the solid line in FIG. 2) above the work receiving portions 4. In this case, by adjusting a pivot angle of the upper block 14, the horizontal clamping positions of the hydraulic cylinders 6 can be fine adjusted with respect to the works W.

Then, the locknut 19 is tightened, and after that the changeover valve 34 is manipulated to be changed over to the pressurized oil supply position. Thereupon, the pressing members 28 are lowered by the hydraulic pressure within the hydraulic actuation chambers 24 through the pistons 23, so that the works W are fixedly pressed by means of the pressing members 28 onto the work receiving portions 4.

Incidentally, when an advancing and retracting stroke of the piston 23 of the hydraulic cylinder 6 is set at least at a value of a screw pitch of the externally threaded portion 3a of the pillar 3, it becomes possible to readily manage a change of a thickness of the work W, which change might be occasionally brought about.

An unclamping operation for the above-mentioned clamping apparatus is carried out in accordance with the following procedures. Firstly, under the aforementioned clamped condition, the changeover valve 34 is manipulated to its pressurized oil discharge position. Thereupon, the pressing member 28 is raised for return by a resilient force of the unclamping spring 25 through the piston 23, so that the work W can be released from the clamped condition. Then, after the locknut 19 has been loosened, the plurality of pressing arms 15 of the upper block 14 are pivoted from the clamping preparation position X to the evacuative position Y. Subsequently, the work W is raised directly by means of the crane.

FIGS. 4 through 10 show a second embodiment of the present invention. In this second embodiment, component members having the same constructions as those in the above-mentioned first embodiment are designated, in principle, by the same symbols.

Figure 4:
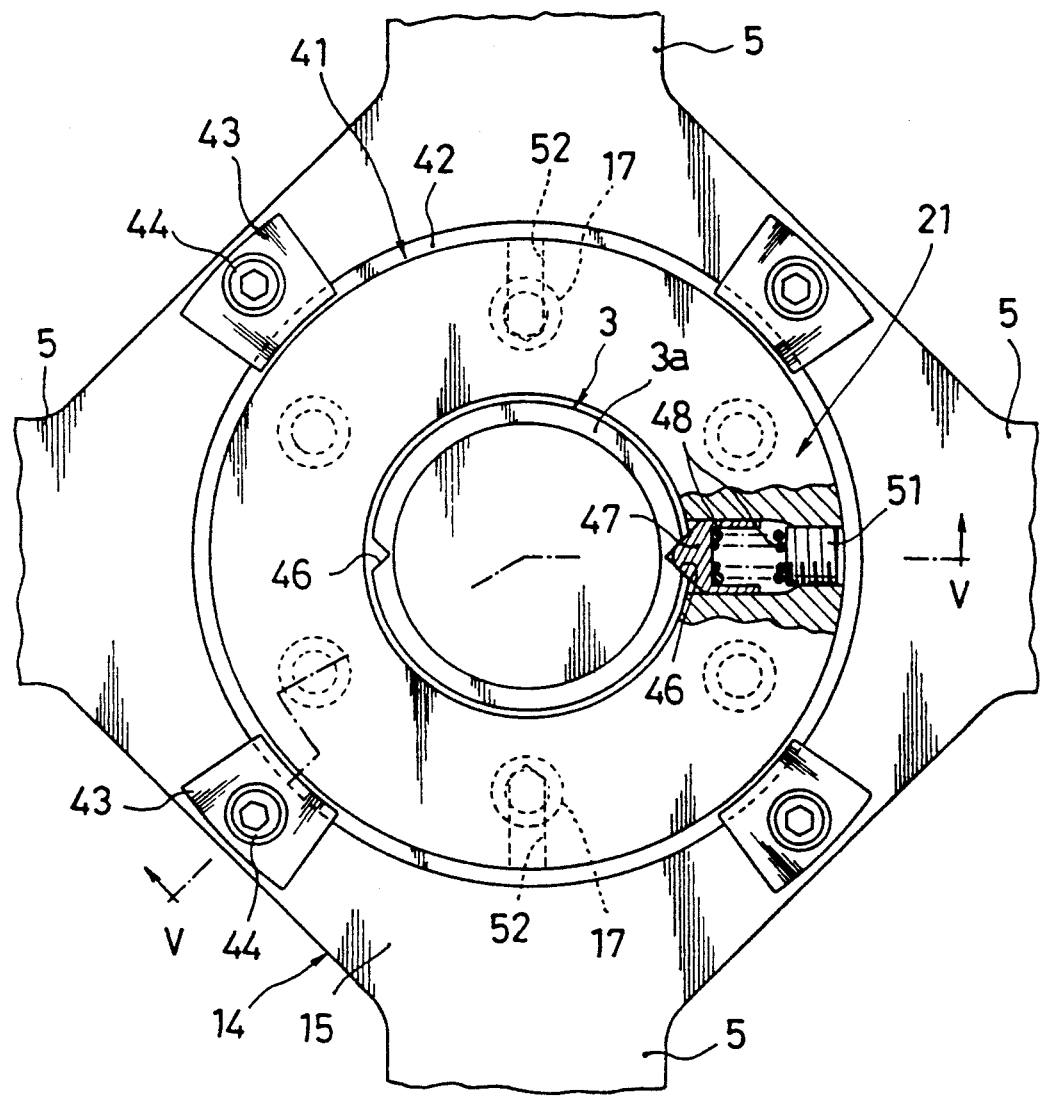
FIGS. 4 through 10 show a second embodiment of the present invention.
Figure 5:
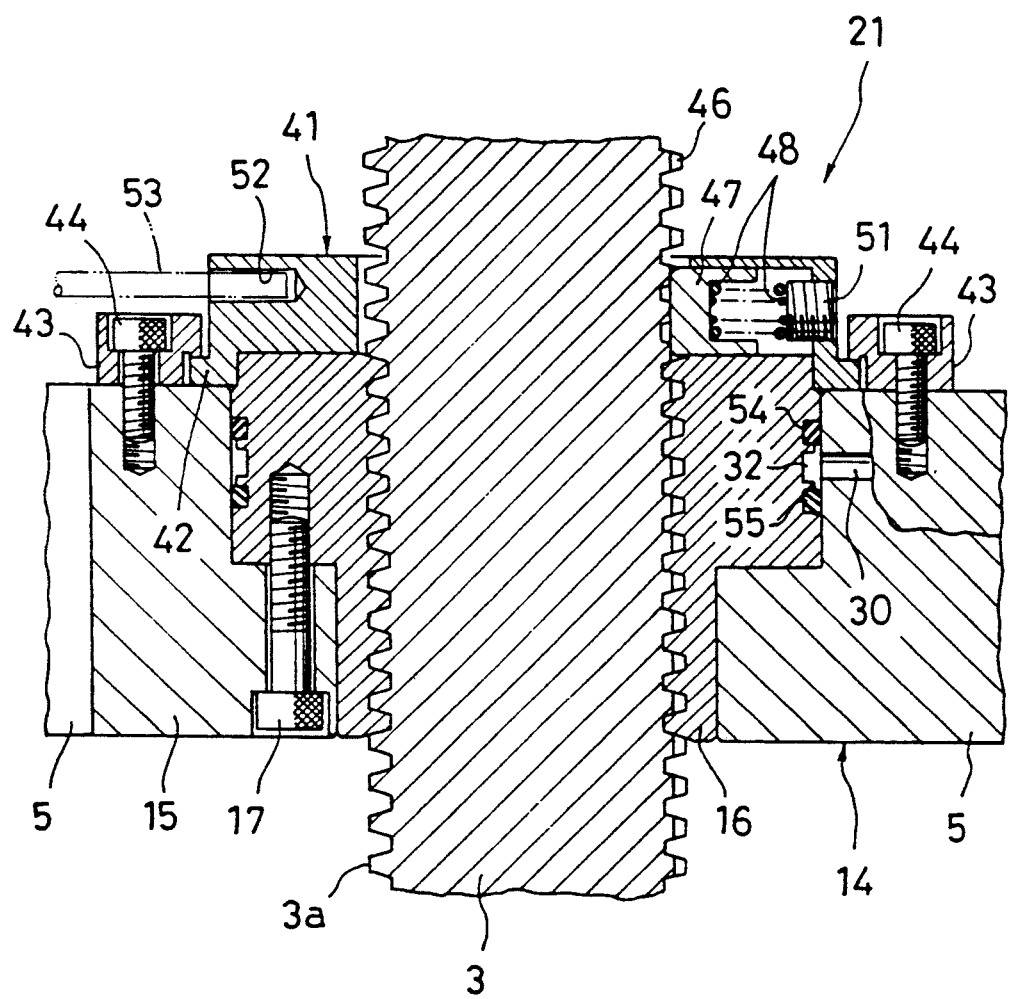

As shown in a plan view of FIG. 4 and a vertical sectional view of FIG. 5, the aforementioned pivot locking device 21 is constructed as follows.

The raising and lowering nut 16 is fixedly secured to the upper block 14 at its central portion by means of a plurality of lower bolts 17, and the nut 16 is threadably engaged with the externally threaded portion 3a of the pillar 3. A ring 41 is pivotally and externally fitted around the pillar 3 and the ring 41 is placed on the upper surface of the nut 16. A flange 42 protruded from the outer peripheral lower portion of the ring 41 is pressed onto the upper surface of the upper block 14 by means of four fixing pieces 43 and four upper bolts 44.

A pair of engagement grooves 46, 46 are formed in the external surface of the pillar 3 so as to extend vertically. An engagement member 47 is inserted into the ring 41 so as to be movable in the diametral direction of the ring 41. This engagement member 47 is resiliently urged inwardly by means of two springs 48 so as to be engaged with the engagement groove 46. The symbol 51 designates an adjusting bolt, the symbol 52 does a turning manipulation hole, and the symbol 53 does a manipulation rod.

Similarly to the above-mentioned first embodiment, the nut 16 has the annular oil passage 32 formed between upper and lower O-rings 54, 55, and the radial oil passages 30 of the respective pressing arms 5 are communicated with the annular oil passage 32.

The pivot locking device 32 operates as follows.

Under the illustrated condition, the upper block 14 has been pivoted to the clamping preparation position and the the engagement member 47 has been engaged with the engagement groove 46. When the work is placed onto the base plate, a pivoting force is applied to the upper block 14 by an operator. Thereupon, the pivoting force is applied also to the ring 41 fixedly secured on the upper block 14 through the fixing pieces 43. Thereby, the engagement member 47 is retracted outwardly against the spring 48 by means of a V-shaped taper surface of the engagement groove 46. As a result, an engagement between the engagement groove 46 and the engagement member 47 is cancelled, so that the upper block 14 can be pivoted to the evacuative position by a small manipulation force.

Then, the work is placed on the base plate. Subsequently, the upper block 14 is pivoted from the evacuative position to the clamping preparation position. Thereupon, when the upper block 14 comes to the clamping preparation position, when the engagement member 47 is automatically engaged with the engagement groove 46 by means of the spring 48. Therefore, the upper block 14 can be readily and precisely positioned at the clamping preparation position. Further, even though a vibration is imposed to the upper block 14 and/or other objects collide against it at this clamping preparation position, a shift of the upper block 14 can be prevented by the engagement between the engagement groove 46 and the engagement member 47.

When the thickness of the work to be clamped is small in dimension, the pivot locking device 21 is manipulated as follows. Firstly, by applying a pivoting force to the upper block 14 at the clamping preparation position the engagement between the engagement groove 46 and the engagement member 47 is cancelled so that the upper block 14 is pivoted and lowered to another clamping preparation position. Then, four upper bolts 44 are loosened, and subsequently the ring 41 is pivoted to the engagement position by means of the manipulation rod 53 so that the engagement member 47 is engaged with the engagement groove 46. Finally, by tightening four upper bolts 44 the ring 41 is fixedly secured to the upper block 14. Thereby, a pivoting of the upper block 14 can be prevented at aforementioned another clamping preparation position.

Incidentally, the pivot locking device 21 is to be operated in accordance with the same procedures as those mentioned above though the thickness of the work to be clamped becomes larger in dimension.

Figure 6:
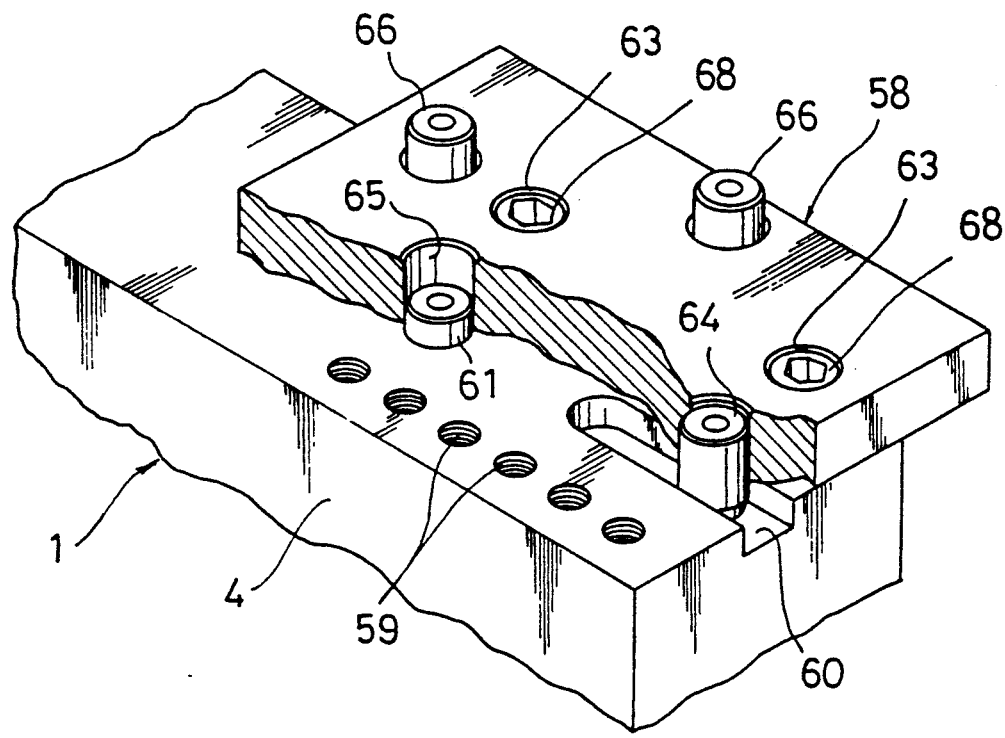

As shown in FIG. 6, a jig plate 58 corresponding to a configuration of the work is attached to the work receiving portion 4 of the base plate 1, so that the work can be positioned on the upper surface of the jig plate 58.

In the work receiving portion 4, two rows of six threaded holes 59 (only one row is illustrated herein) are arranged and also a guide groove 60 and an upwardly projecting pin 61 are arranged. In the jig plate 58, two rows of two bolt holes 63 (only one row is illustrated herein) are arranged and also a downwardly projecting pin 64 and a positioning hole 65 are arranged. The symbol 66 designates a work positioning pin.

The jig plate 58 is attached to the work receiving portion 4 in accordance with the following procedures. Firstly, the downwardly projecting pin 64 and the positioning hole 65 of the jig plate 58 are fitted into the guide groove 60 and to the upwardly projecting pin 61 of the work receiving portion 4 respectively from above. Thereby, the jig plate 58 is positioned in horizontal plane. Then, a plurality of bolts 68 are threadably engaged with the threaded holes 59 through the bolt holes 63 so that the jig plate 58 can be fixed onto the work receiving portion 4.

The above-mentioned construction provides the following advantages. Since it is enough to make those holes in the jig plate 58 only vertically, its manufacturing cost is low. Though a distance between the downwardly projecting pin 64 and the positioning hole 65 in the jig plate 58 is changed, that change can be accommodated by the guide groove 60. Therefore, various kinds of jig plates 58 corresponding to the configurations of the works can be manufactured readily.

Figure 7:
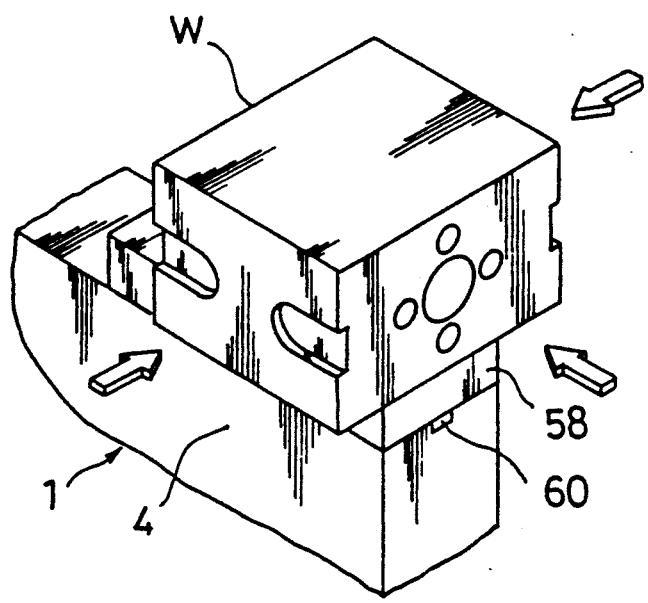
Figure 8:
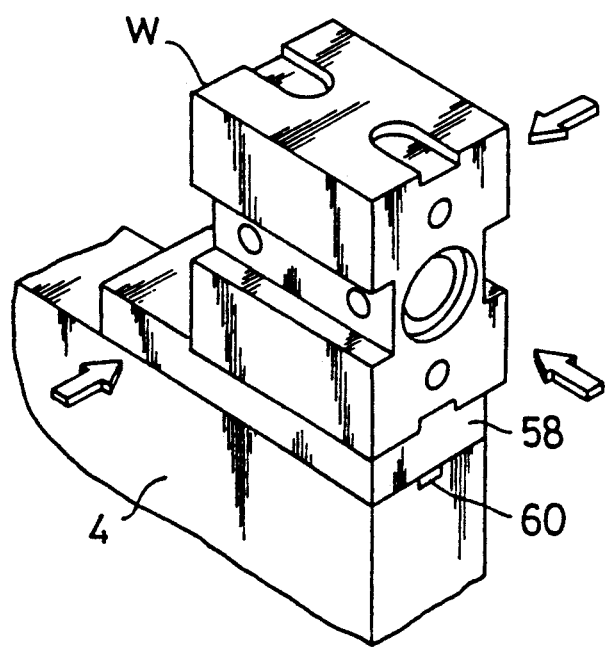

FIGS. 7 and 8 show work machining examples. As shown in a first step of FIG. 7, the work W is positioned forwards laterally on the jig plate 58 attached to the work receiving portion 4. Then, the work W is clamped and three surfaces thereof indicated by the arrows are machined. Subsequently, as shown in a second step of FIG. 8, the work W is repositioned backwards vertically on the jig plate 58. Then, the work W is clamped again and other three surfaces besides the machined three surfaces thereof are machined as indicated by the arrows. By those two steps, all of six surfaces of the work W can be machined.

Figure 9:
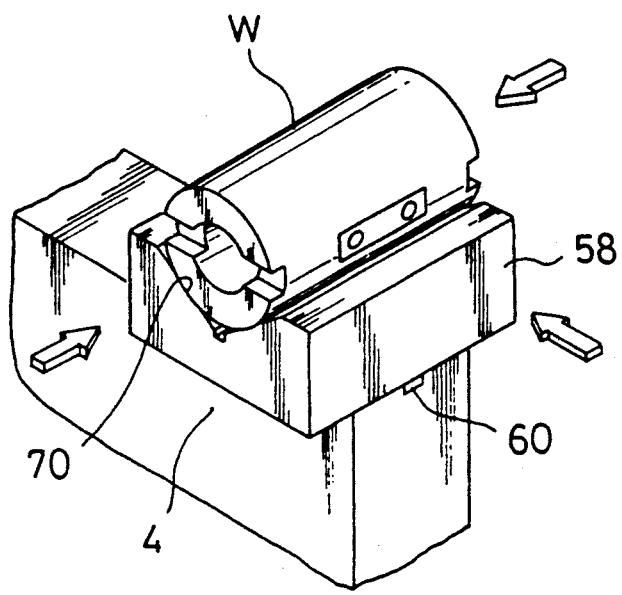

FIG. 9 shows a machining example of a round work W. The work W is positioned by a V-shaped groove 70 formed in the jig plate 58 composed of a V-block.

Figure 10:
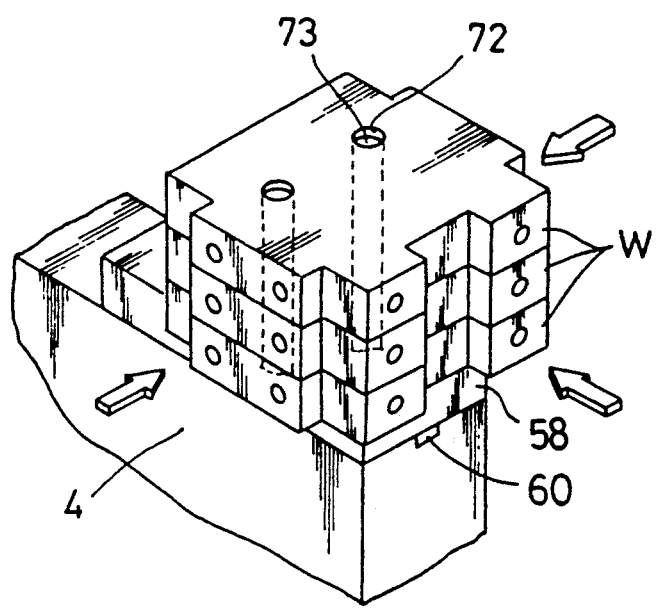

FIG. 10 shows such an example that a plurality of thin works W are machined under the stacked condition at a time. Each work W has two positioning holes 72, into each of which a long positioning pin 73 is inserted.

Figure 11:
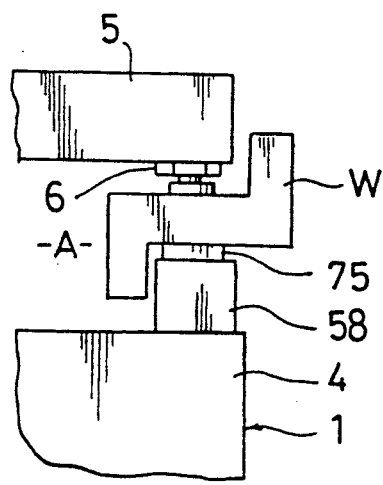
FIG. 11 is an elevational view showing a further work machining example according to the present invention.

FIG. 11 shows a work machining example further different from the above-mentioned examples.

An asymmetric work W is placed on the work receiving portion 4 of the base plate 1 through the jig plate 58 and a spacer 75 in order. The work W has such a configuration that its opposite end portions project in the reverse directions, namely upwardly and downwardly.

Further, the above-mentioned clamping apparatus can be used in accordance with the work configuration as follows.

Figure 12:
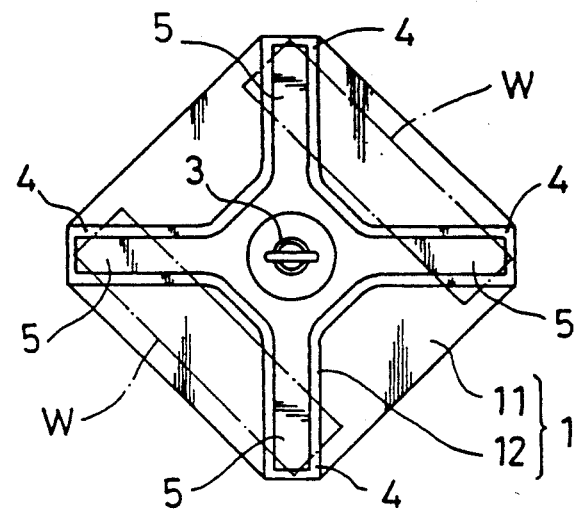
FIG. 12 is a view showing another usage example of the clamping apparatus according thereto.

In a use example of FIG. 12, the laterally elongate work W is placed on neighboring two work receiving portions 4, 4 and fixedly secured by means of two pressing means 5, 5 thereon.

Figure 13:
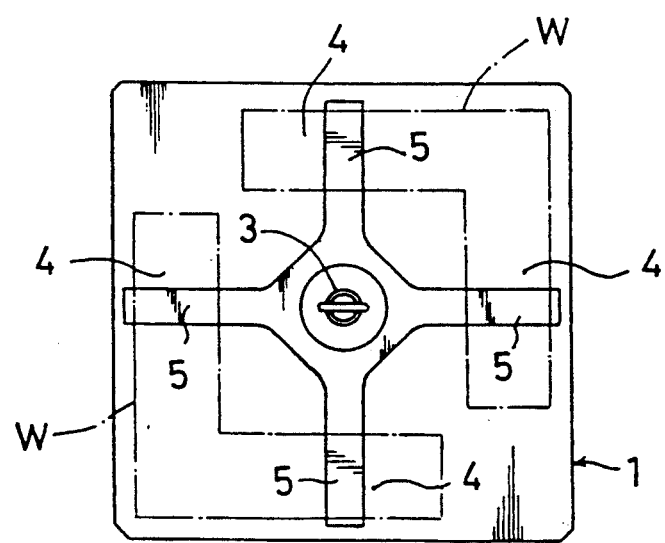
FIG. 13 is a view showing still another usage example of the clamping apparatus.

In a use example of FIG. 13, the L-shaped work W is placed on neighboring two work receiving portions 4, 4 and fixedly secured by means of two pressing arms 5, 5 thereon.

The above-mentioned respective embodiments may be modified as follows.

The aforementioned pressing means 6 may be a pneumatic cylinder instead of the hydraulic cylinder. Further, the pressing means 6 may be such a one employing an electricity-mechanical force conversion means such as piezoelectric ceramics and the like.

The numbers of the plurality of work receiving portions 4 and the plurality of pressing arms 5 may be at least two. But, in order to balance to a clamping reaction force imposed from the plurality of works W to the pressing arms 5, it is preferable to provide even-numbered work receiving portions 4 and pressing arms 5, and it is more preferable to dispose them at equal intervals in the peripheral direction.

Although the invention has been described by reference to particular illustrative examples it will be understood that variations and modifications are possible within the inventive concept.

What is claimed is:

1. A clamping apparatus for a work comprising:
   a base plate (1) having a central portion (2) and a peripheral portion;
   a pillar (3) projecting upwardly from the central portion (2) of said base plate (1), said pillar (3) being composed of an externally threaded rod defining a longitudinal axis;
   at least two work receiving portions (4)(4) peripherally spaced apart in the peripheral portion of said base plate (1);
   a pressing unit including a central portion (16) which is threadably mounted about said pillar (3) at least two pressing arms (5)(5) radially from said central portion (16) toward said work receiving portions (4)(4), said pressing unit being rotatable about and vertically displaceable relative to the longitudinal axis of said pillar (3) through the threaded connection between said central portion (16) and said pillar (3); and
   a pressing means (6) supported by each of said pressing arms (5), each of said pressing means facing said work receiving portion (4) from above and being displaceable, relative to its respective pressing arm (5), toward and away from said work receiving portion (4).

2. A clamping apparatus as defined in claim 1, wherein
   said pressing means (6) is provided with a piston (23) and a fluid actuation chamber (24).

3. A clamping apparatus as defined in claim 2, wherein
   there are provided even-numbered work receiving portions (4)(4) peripherally spaced apart at substantially equal intervals.

4. A clamping apparatus as defined in claim 3, wherein
   an advancing and retracting stroke of said piston (23) is set at least at a value of a screw pitch of said externally threaded pillar (3).

5. A clamping apparatus as a defined in claim 3, wherein
   a radial flow passage (30) is formed within each pressing arm (5) and an annular flow passage (32) is formed in the central portion of said plurality of pressing arms (5)(5), so that each of said fluid actuation chamber (24) is communicated with said annular flow passage (32) through each of said radial flow passages (30).

6. A clamping apparatus as defined in claim 3, wherein
   a pivot locking device (21) is disposed between the central portion of said plurality of pressing arms (5)(5) and said externally threaded pillar (3); and
   said pivot locking device (21) comprises a ring (41) pivotally and externally fitted to said pillar (3), a fixing piece (43) for fixing said ring (41) to the pressing arms (5)(5), an engagement groove (46) formed vertically in the outer surface of said pillar (3), an engagement member (47) supported by said ring (41) so as to be movable in the diametral direction of the ring (41) and a spring (48) resiliently and diametrally inwardly urging said engagement member (47).

* * * * *